(12) United States Patent
Gerber et al.

(10) Patent No.: US 8,904,778 B2
(45) Date of Patent: Dec. 9, 2014

(54) WAVE ENERGY CONVERTER WITH ASYMMETRICAL FLOAT

(75) Inventors: James S. Gerber, Saint Paul, MN (US); George W. Taylor, Princeton, NJ (US)

(73) Assignee: Ocean Power Technologies, Inc, Pennington, NJ (US)

( * ) Notice: Subject to any disclaimer, the term of this patent is extended or adjusted under 35 U.S.C. 154(b) by 888 days.

(21) Appl. No.: 13/065,673

(22) Filed: Mar. 28, 2011

(65) Prior Publication Data
US 2012/0247096 A1 Oct. 4, 2012

(51) Int. Cl.
*F03B 13/18* (2006.01)
(52) U.S. Cl.
CPC ......... *F03B 13/1855* (2013.01); *F05B 2250/14* (2013.01); *F05B 2250/141* (2013.01); *F05B 2270/103* (2013.01); *Y02E 10/38* (2013.01)
USPC .................................. 60/502; 60/499; 60/507
(58) Field of Classification Search
USPC .................................. 60/495–507; 290/42, 53
See application file for complete search history.

(56) References Cited

U.S. PATENT DOCUMENTS 1,021,572 A * 3/1912 Bryson ........................... 60/505

* cited by examiner

*Primary Examiner* — Christopher Jetton
(74) *Attorney, Agent, or Firm* — Henry I. Schanzer, Esq (57) ABSTRACT

A wave energy converter (WEC) having an asymmetrically shaped float and a spar which move relative to each other in response to the waves. The asymmetrical float has one side longer than the other. A power take off device (PTO) is coupled between the asymmetric float and the spar for converting their relative motion into useful power. Apparatus is coupled to the WEC for: (a) orienting and rotating the longer side of the float to face and receive oncoming waves to increase energy capture when the waves have an amplitude below a predetermined value for improving the power generation of the WEC; and (b) rotating the float to orient the narrower side of the float to face and receive the incoming waves when the waves have an amplitude above a predetermined value, so as to reduce the forces to which the WEC is subjected.
There is no known WEC system with an asymmetrical float which is raised and lowered by the waves.

22 Claims, 13 Drawing Sheets

POWER GENERATED VS WAVE PERIOD FOR A SYMMETRICAL FLOAT
AND FOR TWO DIFFERENT ORIENTATIONS OF AN ASYMMETRICAL FLOAT

WAVE ENERGY CONVERTER WITH ASYMMETRICAL FLOAT

BACKGROUND OF THE INVENTION

This invention relates to a wave energy converter (WEC) designed to provide improved efficiency under normal operating conditions and to have improved survivability to large amplitude waves.

Figure 1A:
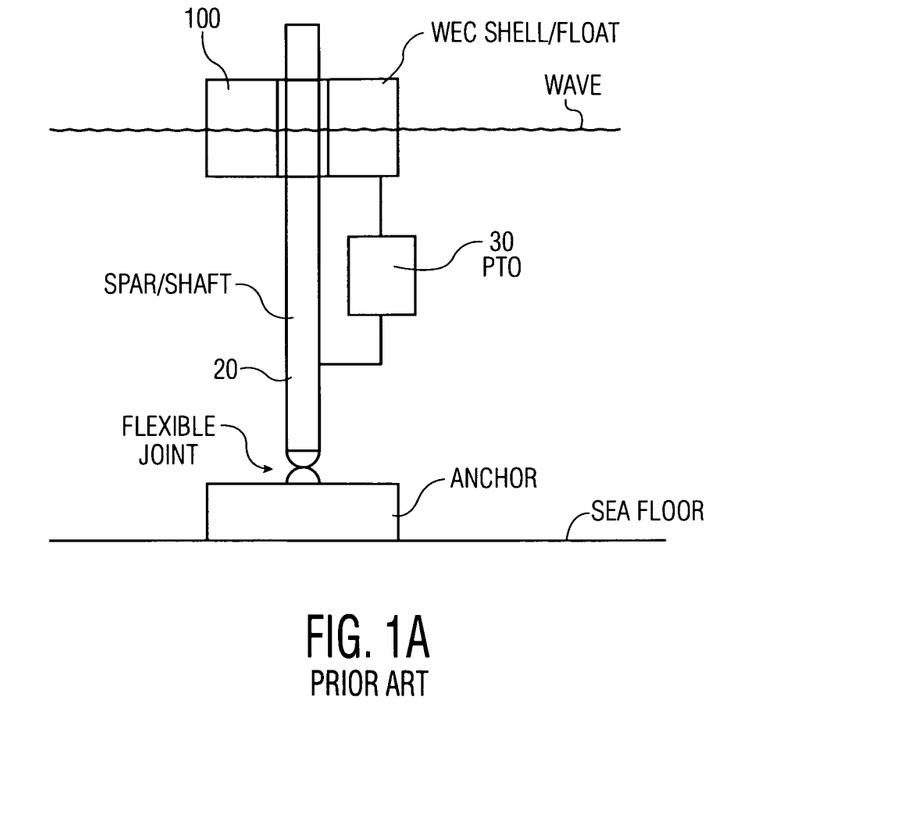
FIGS. 1A and 1B are highly simplified cross-sectional views of prior art WECs.
Figure 1B:
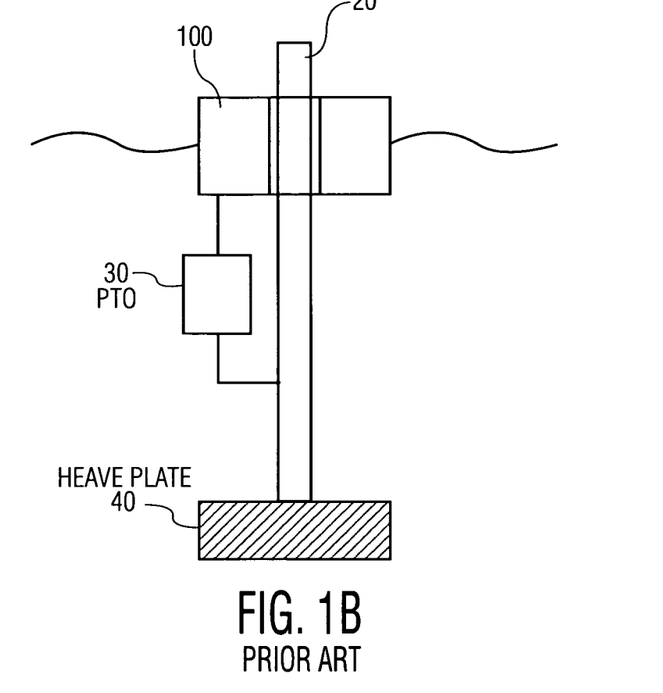

A WEC, as shown in FIGS. 1A and 1B, may include a float 100 and a shaft/spar 20 with a power take off device (PTO), 30, connected between the float and shaft. The float is generally designed to move in synchronism with the waves. The shaft 20 may be designed to be stationary (e.g., anchored to the sea bed as shown in FIG. 1A) or it may be designed so that it can move up and down, in phase with the float but with a time delay relative to the float and/or generally out of phase with the waves and the float, as shown in FIG. 1B, in a configuration which may be referred to as a "dual absorber". In any case, the PTO is connected between the shaft and the float for converting their relative motion into useful energy (e.g., electrical power or different forms of mechanical energy).

Figure 1C:
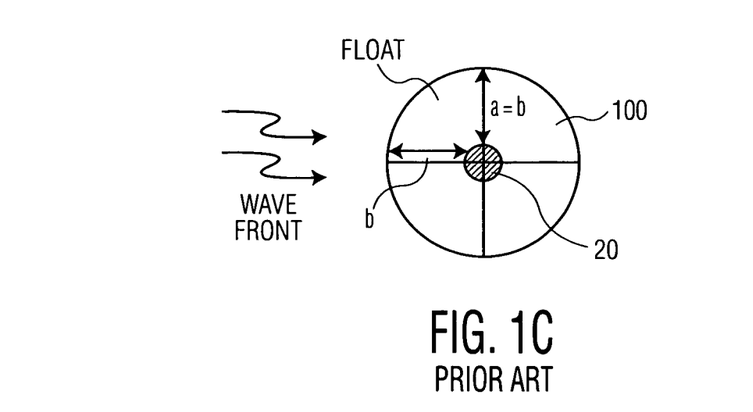
FIG. 1C is a top view of a "symmetrical" float which may be used in the WECs of FIG. 1A or 1B.

The floats 100 of prior art WECs tend to be formed to be generally symmetrical (e.g., circular or square) about the x-y axes, as shown in FIG. 1C. The WECs used may be of the "point absorber" type where the term "point absorber" is generally defined to mean that the characteristic dimension of the float of the WEC is small in relation to the (longer) wave length of the waves, driving the WEC.

In many situations the amount of power that can be produced by a WEC is a function of the surface area of the float subject to be acted upon (lifted or lowered) by the waves. The buoyant force on the float can be estimated as the change in displaced volume of the float as a wave passes by. For waves having a very long wavelength impinging on a float (e.g., the wavelengths are much longer than the dimensions of the float in width or length), the change in displaced height of the float is essentially the same all over the surface of the float. For this case, the shape of the float is not significant in considering its power producing capability. However, for waves impinging on a symmetrical (e.g. circular) float having a wavelength comparable to the dimension of the float, when one side of the float is under the crest of the wave, the other side or edge of the float is not under the crest. When this occurs there is a cancellation effect. The buoyant forces of the wave do not act (e.g., lift) across the full surface area of the float. In this instance, the amount of power that can be produced is significantly reduced.

Figure 1D:
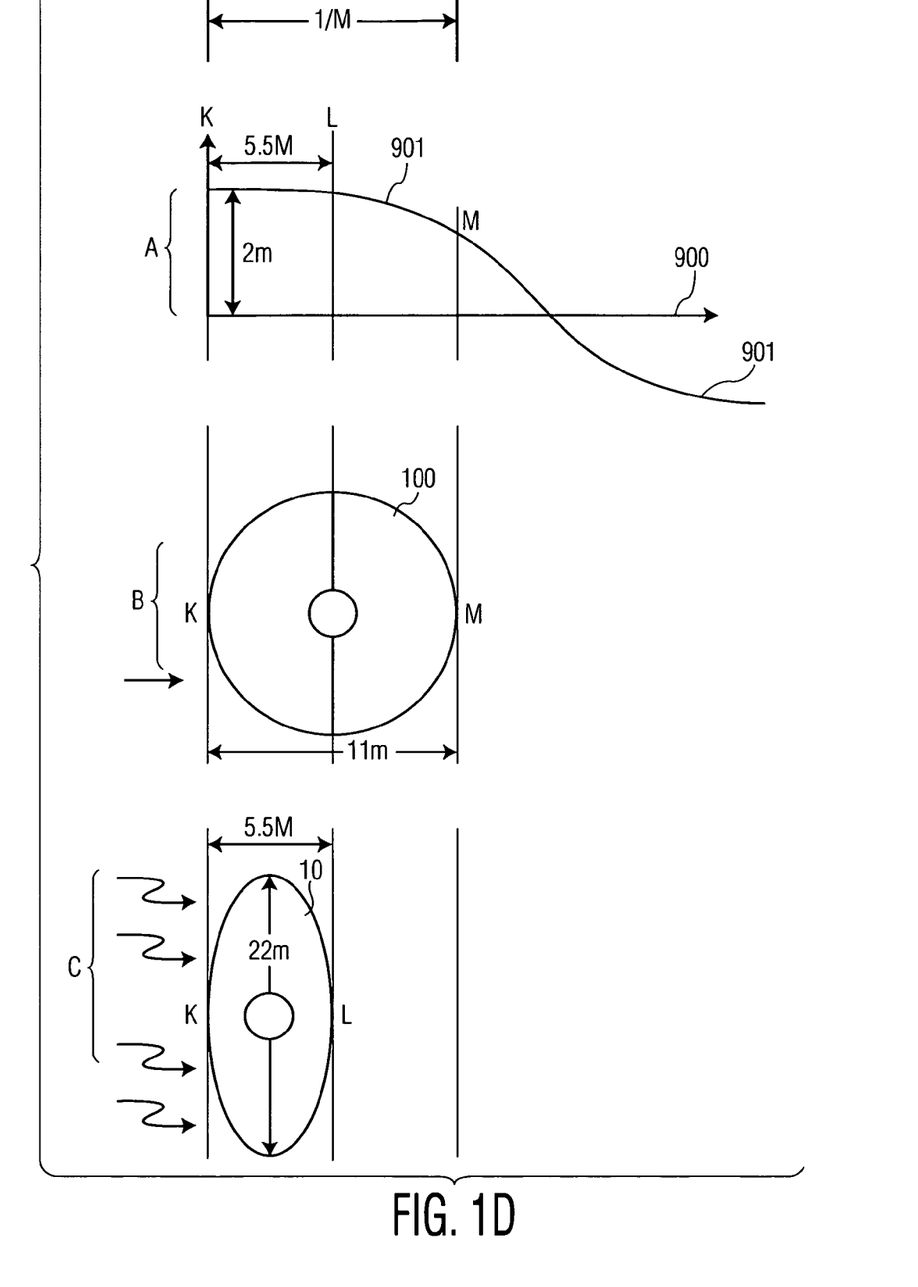
FIG. 1D is an idealized simplified drawing illustrating the effect of an incoming wave on a symmetrically shaped float (as per the prior art) and on an asymmetrically shaped float (intended for use in practicing the invention)

This may be better explained with reference to FIG. 1D which illustrates the effect of a wave on a symmetrical float (section B of 1D) and an asymmetrical float (section C of 1D). Section A of FIG. 1D shows a wave 901, having a period of 7 seconds, a wave height of 2 meters and a wavelength of approximately 75 meters. For purpose of illustration, waveform 901 is shown to have a peak value (crest) at point K, a lower value at a point L, which is 5.5 meters away from the crest, and a still lower value at a point M, which is 11 meters away from the crest. Consider now a prior art circular float 100 (as shown in section B of 1D) having an outer diameter of 11 meters which is subjected to waveform 601. As shown in the drawing, the left side of the float (K) lines up with the peak of the wave crest. It is evident that, for this wave condition, only part of the float's surface area will be subjected to the full force corresponding to the wave amplitude. The rest of the float will be subjected to a lower force and may even be pushing down, canceling the up-lifting force. Thus, the power developing/producing capability of the float 100 is significantly reduced. For waves whose wavelength is even less than that shown for wave 901, it is evident that even less power can be developed and produced.

To overcome this problem, it is proposed that the float be made asymmetrical, as per the top view shown in section C of FIG. 1D. For example, there is shown an elliptical float 10 with a length of 22 meters (long side) and a width of 5.5 meters (short side). The area of the symmetrical float in B of FIG. 1D is essentially the same as the area of the asymmetrical float in C of FIG. 1D. As may be seen, essentially the full surface area of the asymmetrical float will be subjected to the full force of the wave 901. So, from the point of view of power production it is desirable to have an asymmetrical float with its longer side facing the direction from which waves are incident. Clearly, the non-symmetric float has preferred characteristics for wave energy conversion for waves having shorter wave lengths, relative to the size of the float. That is, for waves having shorter wave lengths, relative to the size of the float, a properly oriented non-symmetrical float of similar area to a symmetrical float will convert wave energy to a useful form of electricity more efficiently, i.e., more of the power in the wave will be converted to a useful form of power than for a prior-art symmetrical float.

Therefore, for waves whose wavelengths are within a "normal" range (e.g., ranging from less than a 5 second period to more than a 14 second period), it is desirable to have an asymmetrical float to capture more wave energy and optimize wave power conversion. However, Applicants recognized that a significant drawback exists to the use of the asymmetrical float because: (1) the direction of the incoming waves may vary undoing the benefits sought; and (2) it has greater susceptibility to being damaged under storm conditions. That is, where the typical wave amplitude is less than 4 meters, the WEC is designed to be operational for and survive the typical wave condition. However, under storm conditions where the wave amplitudes are greater than normally expected (e.g., the waves have amplitudes greater than 4 meters) greater buoyant forces are applied to the asymmetrical float and significantly higher forces are developed between the float and spar tending to damage the WEC and its PTO. In consideration of these problems, there is no known WEC system with an asymmetrical float which is raised and lowered by the waves.

Thus, while it is desirable to have the long side of an asymmetrical float facing incoming waves for improved wave energy conversion, there is a problem with the survivability and operability of the WEC under storm and varying wave conditions.

SUMMARY OF THE INVENTION

Applicants' invention resides in part in the recognition of the problems discussed above and, in part, in the recognition that, for power conversion efficiency an asymmetrical float should be used. Applicants' invention also resides in the recognition that: (1) the float should be rotated so its long side faces the incoming waves in order to increase energy capture; and (2) the float should be re-oriented (rotated) so its profile to oncoming storm condition waves is decreased in order to reduce the application of excessive, potentially destructive, forces and in order to increase the survivability of the WEC. Thus, WEC systems embodying the invention include means for rotating the WEC as a function of wave conditions.

Note that the term "normal" wave condition refers to a range of wave amplitudes for which the WEC is designed to be operational (and which are within the range of amplitudes typically encountered at the site where the WEC is intended to be located) and that the term "storm conditions" refers to the conditions existing when the wave amplitudes exceed the normal range.

A WEC embodying the invention includes an asymmetrical float intended to move generally, up and down, in phase with the waves and a spar which is either stationary or which is designed so that it can move up and down, in phase with the float but with a time delay relative to the float, and/or generally, up and down, out of phase relative to the float. A PTO is connected between the float and spar to convert their relative motion into useful energy (e.g., electric power). The asymmetrically shaped float has a longer side and a narrower side. The WEC includes apparatus for orienting the longer side of the float so it faces the incoming waves for increasing the wave energy conversion efficiency of the WEC and for orienting the float so its narrower side faces the incoming waves under storm conditions to improve the survivability of the WEC.

The float has top and bottom surfaces which extend generally parallel to the water surface and the float moves up and down generally in-phase with the waves. The spar extends in a direction generally perpendicular to the surface of the water. The float is "asymmetrical" (e.g., rectangular or oblong). That is, the float will have a "longer" (or "beam") side and a "narrower" ("shorter" or "head") side; its length (L) will be greater than its width (W). The longer side is designed to normally face the incoming waves to improve the power conversion efficiency of the WEC to incoming waves whose frequency and wavelength is within a predetermined range.

In accordance with one embodiment, the float may be designed to have a width which is small compared to the range of the normally expected wavelengths of the incoming waves.

To reduce excessive stresses to which the WEC may be subjected during storm conditions, WECs embodying the invention include means for selectively, or automatically, (e.g., actively or passively) re-orienting the asymmetrical float so that during "normal" operating conditions the long side of the float faces the incoming waves and during a "storm" condition the shorter, narrower, side faces the incoming waves. Thus, the long side of the float will be turned towards the waves under those conditions where it is desired to produce power, and the short side of the float will be turned towards the waves under storm conditions to reduce stresses to which the WEC may be subjected.

In accordance with one aspect of the invention, the asymmetrical float may be keyed (interleaved, or engaged) to the spar to allow the float and spar to move up and down relative to each other while blocking relative rotational motion between them. Where the float and spar cannot be disengaged, a means is provided to rotate the float and spar together. There may further be included an anchoring or mooring mechanism to allow the spar/float to rotate without straying too far from a desired position.

In accordance with another aspect of the invention, the asymmetrical float may be coupled to the spar to allow them to move up and down relative to each other while blocking relative rotational motion. To rotate the float, the spar and float are decoupled to allow the float to rotate relative to the spar.

BRIEF DESCRIPTION OF THE DRAWINGS

In the accompanying drawings, which are not drawn to scale, like reference characters denote like components.

FIG. 2A(1) is an idealized, simplified, top view of an asymmetrical float with its "long" side oriented to capture the oncoming waves for increased power conversion efficiency (maximum energy capture) in accordance with the invention;

FIG. 2A(2) is an idealized, simplified, top view of an asymmetrical float with its "short" side oriented to face the oncoming waves under storm conditions for reducing the forces to which the WEC is subjected;

DETAILED DESCRIPTION OF THE INVENTION

Figure 2:
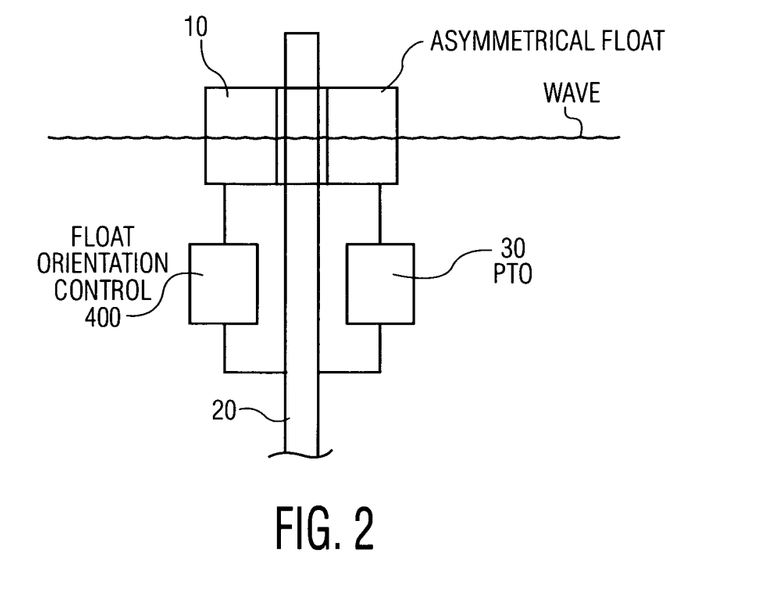
FIG. 2 is a highly simplified cross-sectional view of a WEC embodying the invention.

FIG. 2 is a simplified cross sectional diagram illustrating that a WEC embodying the invention includes: (a) an asymmetrical float 10; (b) a spar 20; (c) a PTO 30 coupled between the float and the spar to convert their relative motion into useful energy (e.g., electric power); and (d) an apparatus 400 coupled to the float 10 for changing the orientation of and/or rotating the float 10 as a function of certain wave conditions and/or other selected conditions, such as, for example, maintenance.

The asymmetrical float 10 is normally oriented so its longer side faces the incoming waves when the wave amplitudes are within a "normal" range. For the condition where the direction of the incoming waves changes, the asymmetrical float 10 is rotated so its longer side keeps on facing the incoming waves, thus maintaining the improved energy capture. However, when the amplitudes of the waves exceed the "normal range", the float is re-oriented so its narrower side faces the incoming waves.

In accordance with an aspect of the invention, the asymmetrical float 10 may be rotated (in increments or continuously) as a function of a change in the direction of the incoming waves so that its long axis is kept (or remains) generally perpendicular to the direction of the incoming waves for maintaining improved power producing efficiency.

Figure 2A:
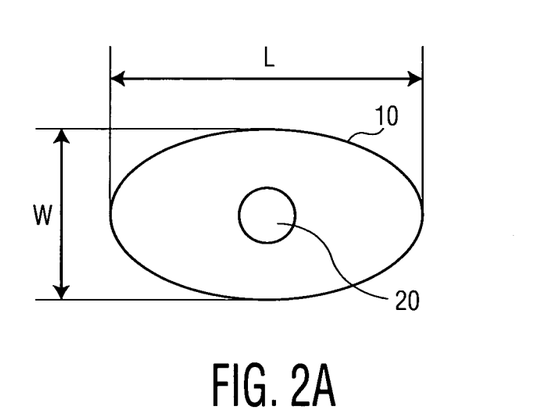
FIG. 2A is a top view of an asymmetric (elliptical) float for use in practicing the invention.
Figure 2B:
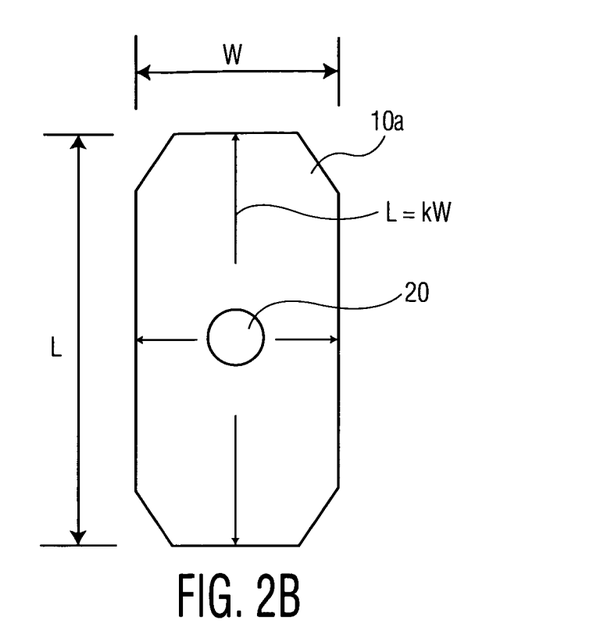
FIG. 2B is a top view of an asymmetric oblong (boxy) float for use in practicing the invention.
Figure 2C:
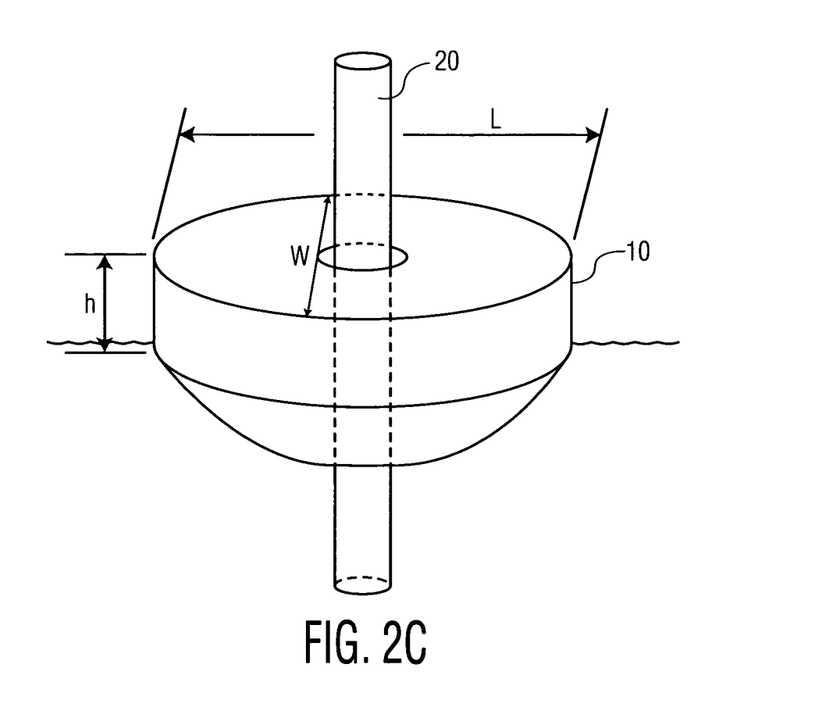
FIG. 2C is an isometric view of an asymmetric elliptical float and spar for use in practicing the invention.

The asymmetrically shaped float 10 may have an elliptical shape as shown in FIGS. 2A and 2C, or a "boxy" rectangular shape as shown in FIG. 2B, or it may have any number of different suitable shapes. The asymmetrically shaped floats, contemplated for use in practicing the invention, have one side ("axis") which is greater (longer) than the other side. As shown in FIGS. 2A, 2B and 2C, the longer ("beam") side (or longer axis) of the float has a dimension "L" and the shorter, or narrower, ("head") side (or shorter axis) has a dimension "W"; where L is greater than W. The length "L" may be expressed as a function of kW; where k is any number greater than one (1); and the upper limit on "k" being the structural viability of the float. When operational, the float has top and bottom surfaces which lie or extend along, and generally parallel to, the surface of the body of water and the float moves up and down generally in phase with the waves. Each of the embodiments of the asymmetrical float provides the benefits associated with the present invention (i.e. increased power in operational waves, decreased sensitivity to storm waves in survival conditions.)

In systems embodying the invention, the spar 20 may be firmly anchored to the sea bed (as shown, for example, in FIG. 1A) or it may be allowed to move up and down in a generally perpendicular direction to the surface of the body of water (as shown, for example, in FIG. 1B).

The PTO 30 is coupled between the spar and the float for converting their relative motion into useful power (e.g., electrical power). The PTO may be a rack and pinion device or a linear electric generator or functional equivalents. Note that, typically, a part of the PTO is connected to the float and another part is connected to the spar and that these two parts of the PTO must interact (be engaged) to produce the useful power. When the float is subjected to rotation, it is imperative to ensure that the structural integrity of the PTO be maintained. For certain types of PTO devices where the spar and float are mechanically linked together (and even where they are only electromagnetically coupled) means are required to: (a) decouple the spar from the float to allow the float to move rotationally independently of, and relative to, the spar; or (b) maintain the mechanical coupling between the spar and float while providing mooring apparatus for enabling the spar and float to rotate together.

Figure 3:
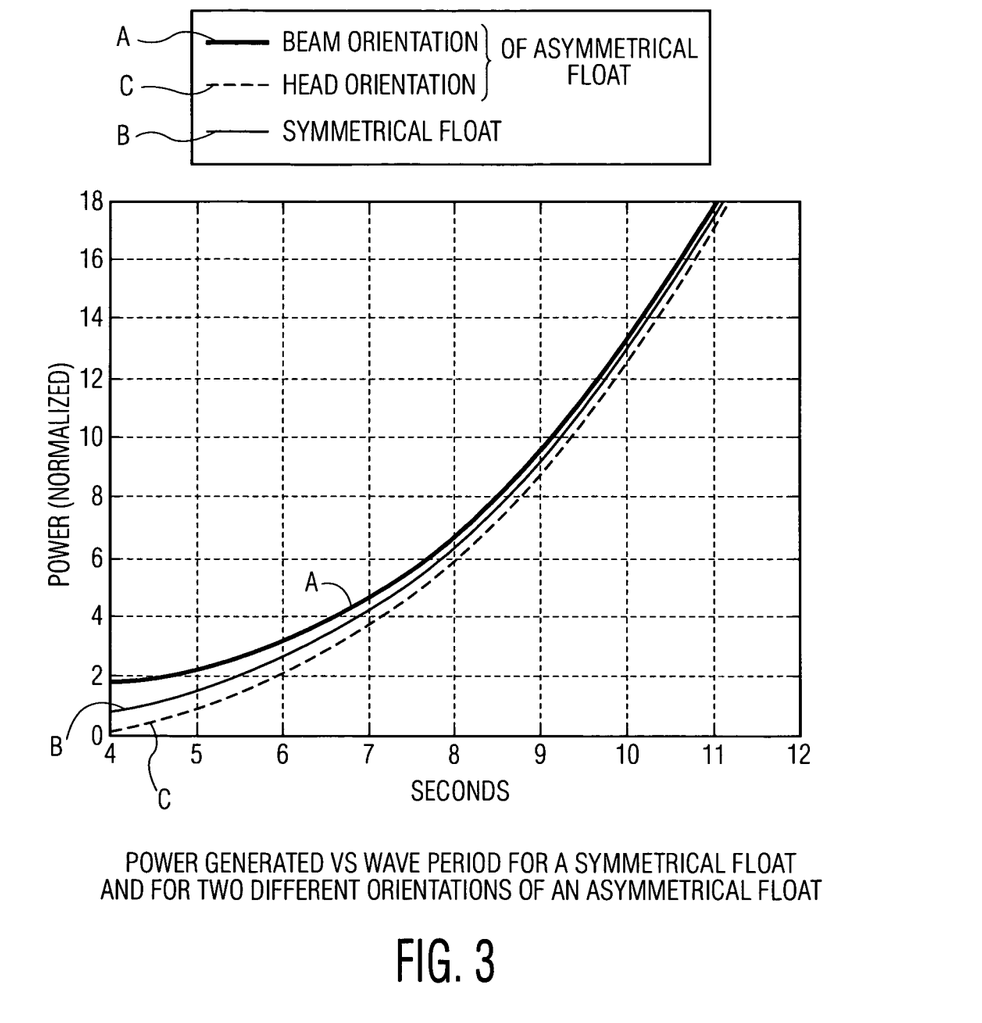
FIG. 3 shows a comparison of wave power conversion for a circular float (see FIG. 1A or 1B) and an elliptical float (see FIGS. 2, 2A) with an aspect ratio of 1:4 in a long-axis—facing the incoming waves configuration and in a "head-on" (long-axis—parallel to the incoming waves) configuration.

As shown in the figures, WECs embodying the invention include apparatus 400 for controlling and changing the orientation ("rotation") of the float 10. The apparatus 400 may be passive or active, as discussed below. The need for changing the orientation of the float will now be further reviewed. FIG. 2A(1) shows the asymmetrical float 10 oriented such that its long side ("axis") is generally perpendicular to the direction of the incoming waves. This configuration ensures that more power is obtained and greater power conversion efficiency is achieved for a broad range of waves of different wavelengths, as compared to the prior art symmetrical floats see FIG. 3). This orientation (i.e., as shown in FIG. 2A1) is intended to be maintained as long as the amplitudes of the waves are within a prescribed range. The prescribed range may be defined as the "normal" range of wave amplitudes for which the WEC is to be operated for the orientation of FIG. 2A1. By way of example, in seas where the expected "normal" range of wave amplitudes is up to 5 meters, the WEC is designed to respond to and operate and withstand the forces resulting from waves of up to 5 meters in amplitude. Thus, for the "normal" expected range of wave amplitudes, the WEC and its PTO 30 are designed to be fully functional and operational for the asymmetrical float orientation shown in FIG. 2A1.

As already noted above and as illustrated in FIG. 3, the power (see waveform A) generated by a WEC having an asymmetrical float which has its long axis facing (perpendicular to) the incoming waves is greater than: (a) the power (see waveform B) generated by a WEC having a symmetrical float of like surface area; and/or (b) the power (see waveform C) generated by the WEC with the asymmetrical float when its short axis is facing the incoming waves.

However, when the amplitudes of the waves exceed the normally expected range which the WEC was designed to withstand (e.g., there is a storm condition), the forces pushing the float and spar (generally in opposite directions) give rise to stresses which may cause the WEC (and the PTO) to be irreparably damaged. Note that the asymmetrically shaped float captures more of the forces of the waves and thus functions to increase the potentially destructive forces to which the float and the WEC are subjected under storm conditions. This problem has limited the development of WECs with asymmetrical floats or their use in a reliable WEC power producing system. There are two basic problems with using asymmetrical floats: (1) increased stresses to storm conditions; and (2) keeping the long side of the float perpendicular to the oncoming waves and maintaining the structure and operability of PTO.

Applicants recognized the problems and designed a system in which an asymmetrical float: (1) can be rotated to track to maximize the float profile facing the incoming waves to enhance energy capture; and (2) can be rotated to reduce the profile of the float facing the incoming waves to overcome the problem with excessive forces being present under storm conditions. So, for conditions akin to the storm condition, the float is rotated so its narrower portion faces the incoming waves as shown in FIG. 2A(2). In this configuration there is a decreased frontal area presented to the incoming waves, which results in decreased forces on the WEC. This is significant in, and for, the survivability of the WEC.

But note that there are conditions under which it may be desirable to still operate the WEC after rotation to a 'head-to-the-waves' configuration.

Example

In very long waves the decrease in wave forcing is small if the float is rotated (small because the wave is so long.) However, there will be less force on the bearings, so that could have a net improvement on power.

The control apparatus 400 encompasses the means to change and control the orientation of float 10. The apparatus 400 may be an active system or a passive system or a hybrid system. Also, the apparatus 400 may be designed to cause the float 10 to rotate incrementally or in a continuous manner over a wide angular range.

Figure 4:
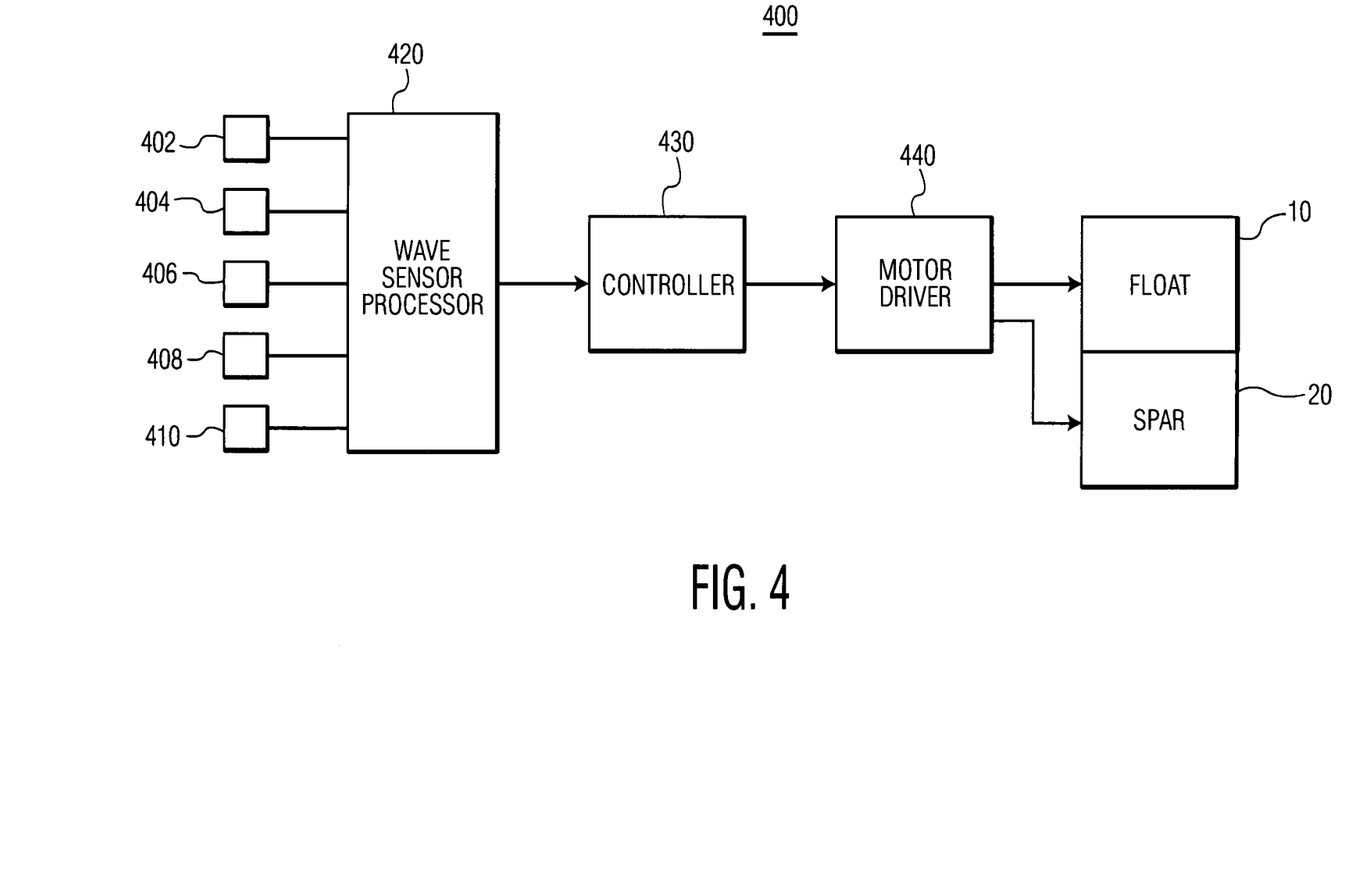
FIG. 4 is a simplified block diagram of an electro-mechanical system for changing and controlling the orientation of an asymmetrical float.

One embodiment of the apparatus is shown in a highly simplified block form in FIG. 4. Various wave conditions may be sensed and processed, and based on the processed information and predetermined data, the float and/or the spar may be rotated to re-orient the float with respect to the direction of the incoming waves.

FIG. 4 illustrates that many different sensors may be used to sense the condition of the waves and provide their signals to a controller 430. By way of example:

(a) a sea state sensor 402 sensing the differential movement between the spar and float may be used to provide signals to the controller; or (b) an accelerometer 404 responsive to the differential movement of the spar and float may be used to provide signals to the controller; or (c) a receptor 406 responsive to satellite or other external source may be used to provide signals pertaining to the waves (or any other system condition) to the controller; or (d) an acoustic doppler profiler 408 or a wave monitoring buoy may be used to supply signals pertaining to the waves (or any other system condition) to the controller 430; or (e) an auxiliary wave monitoring buoy 410 may be used to sense and supply signals to the controller.

In FIG. 4 a wave sensor processor 420 is shown connected between the various wave sensors and the controller 430. The signals from the various sensors can be supplied directly or via wireless connection to the controller 430. Although not explicitly shown, it should be appreciated that sensors and their signals may be coupled or supplied to the processor 420 or controller 430 by an external (remote or satellite) weather/wave forecast.

In response to the received wave condition signals, the controller 430 supplies a command signal to a motor driver 440 which is coupled to the float and/or the spar to cause the float and/or the spar to rotate to a new position for causing the WEC to produce more power or for reducing forces to which the WEC is subjected so as to increase its survivability. The system of FIG. 4 provides an active mechanism for: (a) rotating the asymmetrical float independently of the spar (e.g., when the float can be disengaged from the spar); and/or (b) rotating the float and the spar together (e.g., where they are keyed to each other to prevent relative rotation between the spar and float while allowing relative up down motion relative to each other.

As noted above, the orientation control 400 can be used to rotate the float on a continuous basis in the event that the direction of the incoming waves changes so as to capture more (or less) of the incoming waves. It should also be noted that the float may also be rotated via control 400 if so needed for purpose of maintenance.

Figure 5:
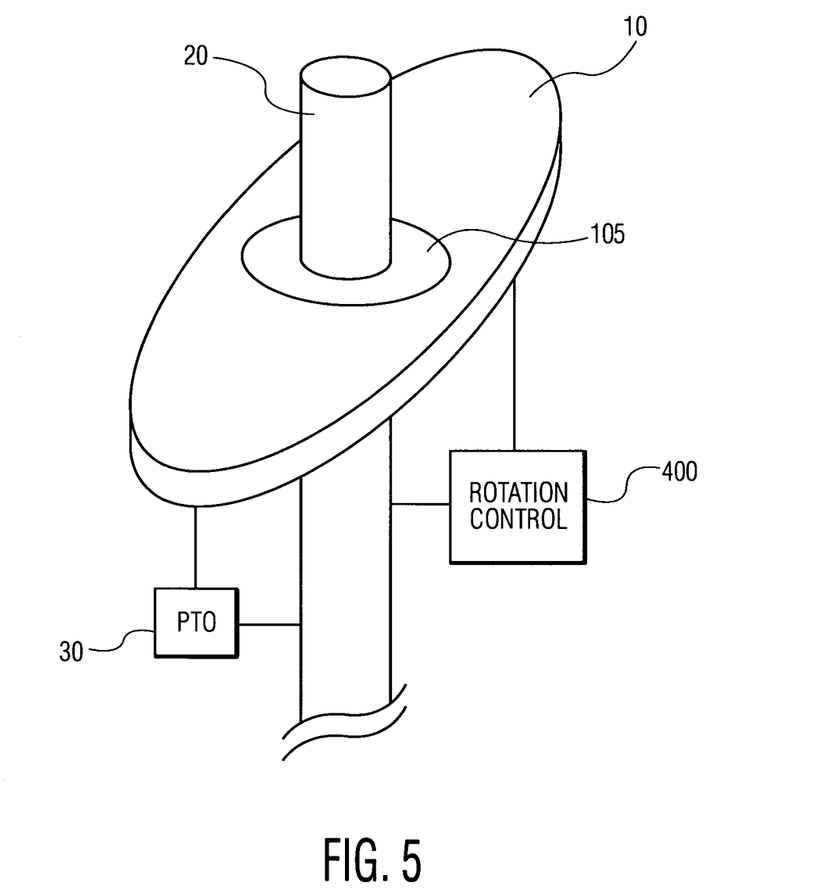
FIG. 5 is a simplified drawing of a WEC illustrating the use of an electro-mechanical system for changing and controlling the orientation of an asymmetrical float.

The control system shown in FIG. 4 may be used to control the asymmetrical float of the WEC shown in FIG. 5. FIG. 5 illustrates that there may be provided an element 105 which includes linear bearings which move up and down the shaft 20. The element 105 also includes rotational bearings around which the elliptical float 10 may be made to rotate in accordance with the invention. The element 105 contains some or all of the PTO 30 within it. This obviates the need for the PTO to support rotating float/spar components. The rotation of the float takes place around the element 105. There may be a rotation controller 400 located inside the float.

Figure 6A:
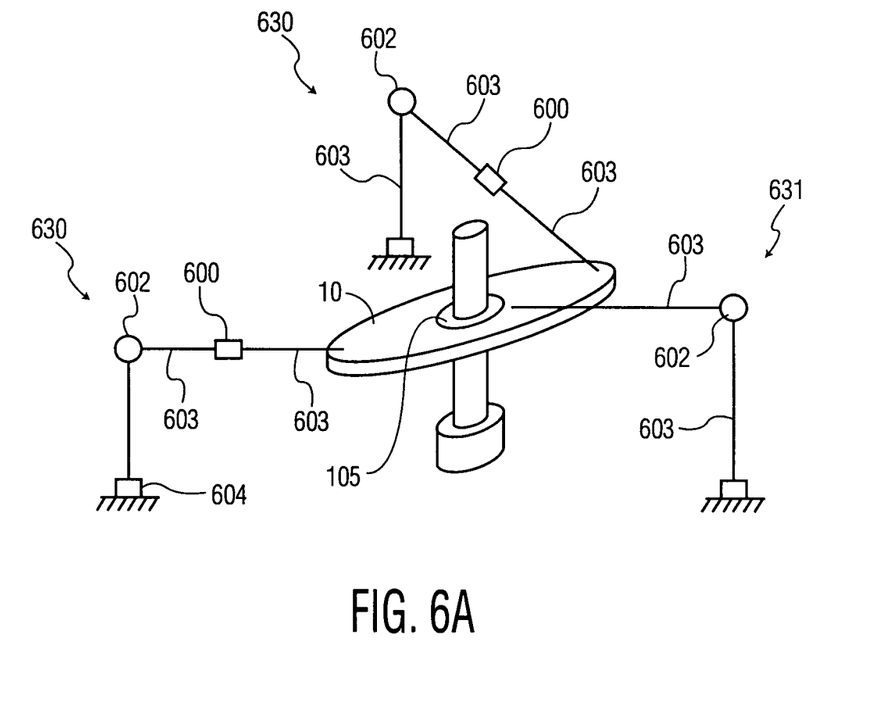
FIGS. 6A, 6B, and 6C are highly simplified diagrams of apparatus for controlling the orientation of an asymmetrical float in accordance with the invention.
Figure 6B:
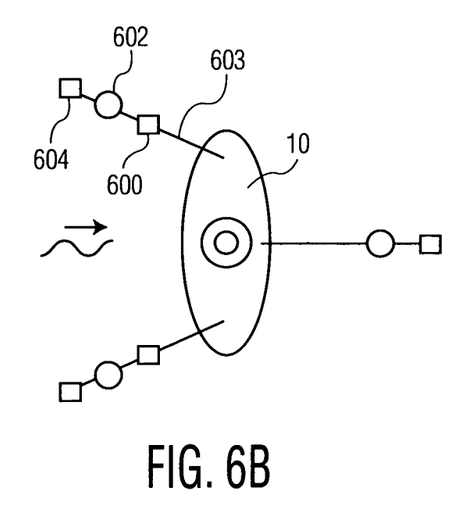
Figure 6C:
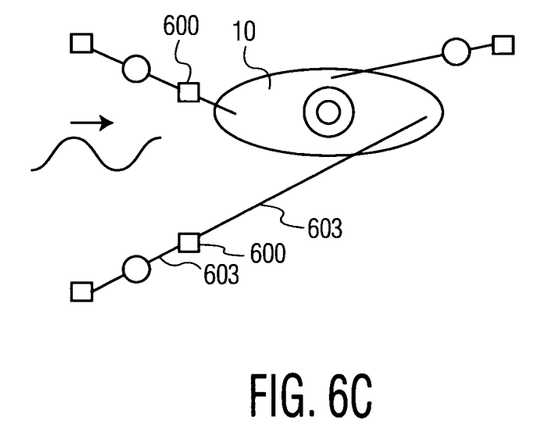

Another method for mechanically positioning a float 10 is shown in FIGS. 6A, 6B, and 6C. This method relies on changing the configuration of mooring legs to change the orientation of the WEC. FIGS. 6A and 6B show the WEC in the operational configuration, so that the long axis of the float 10 is perpendicular to the direction of incidence of the waves. FIG. 6B is a view from the top. Each of the two "upstream" mooring legs 630 includes an anchor 604, mooring lines 603, auxiliary surface buoys (ASBs) 602. There is a mechanism 600 on one or more of the mooring lines 603. The mechanism 600 can cause the mooring leg on which it is attached to increase or decrease in length, which will have the effect of causing the float 10 to rotate. The manner in which a change in length of the mooring line 603 will lead to rotation of the WEC is indicated by the different configurations shown in FIG. 6C and FIG. 6B.

If the float is moored via mooring lines, as shown in FIG. 6, then a means to change the orientation of the float with a passive method is to have the mooring mechanism 600 allow movement of the mooring line 603 if the tension exceeds a predetermined level. Movement of the mooring line 603 will lead to rotation of the float so that the float is positioned in the desired orientation relative to the waves. For the rotation to take place in accordance with the invention, only one mooring mechanism 600 need to have a passive payout capability.

Figure 7A:
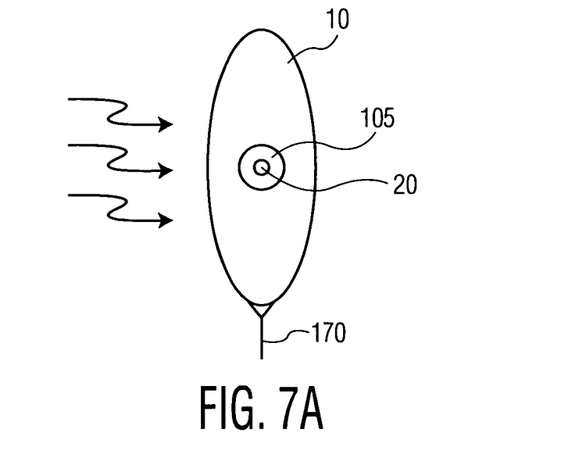
FIGS. 7A, 7B, and 7C are highly simplified diagrams of different asymmetrical floats shaped to passively control the orientation of the floats.
Figure 7B:
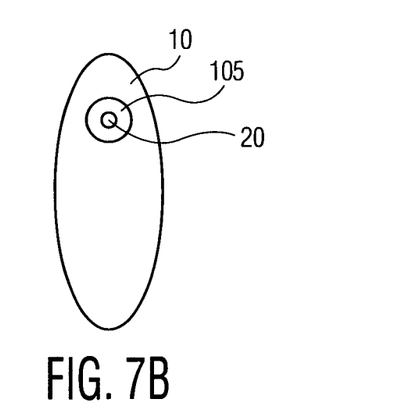
Figure 7C:
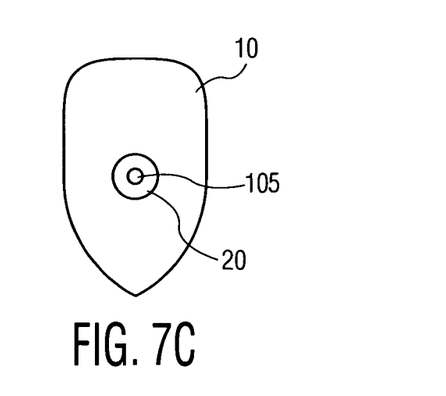

Other structures for enabling the orientation of the float to change are shown in FIGS. 7A, 7B and 7C. These structures enable the use of passive (and generally automatic) means to orient and/or re-orient the float. In these embodiments, each float may be moored via a bearing mechanism 105. If so, then asymmetrical floats such as those shown in FIG. 7A, 7B, or 7C can be caused to passively self-orient by allowing the bearing mechanism to rotate freely.

FIG. 7A shows a WEC having an asymmetrical float 10 to which is attached a fin, or vane, 170, for passively causing a rotation (re-orientation) of the float under storm conditions. A spar/shaft 20 and a set of rotating bearings 105 are located at the center of the float. The vane 170 can assist with passive orientation of the float under storm conditions. Under "normal" wave conditions, the vane 170 will not significantly affect the operation and/or orientation of the float 10. The vane 170 will simply move up and down with the float, and not have significant hydrodynamic interactions. In storm conditions, if the waves are incident such that the crests are parallel with the longer axis of the float (which is not the desired orientation) then there will be a large force on the vane 170 which will tend to cause the float 10 to rotate so that the vane is oriented away from the direction of the incoming waves. This will cause the float 10 to rotate to the desired orientation for storm conditions. It should be appreciated that this mechanism may be used to correctly position the float passively, or it may be used to assist a mechanical positioning mechanism, or it could serve as a fail-safe method for positioning the float in the event of a failure of a mechanical (active) positioning mechanism.

FIG. 7B shows an embodiment in which the central shaft 20, and the rotating bearing 105 are not centered on the float. The offset is intended to help orient the float in storm conditions as a passive positioning mechanism as discussed for the float shown in FIG. 7A.

FIG. 7C shows an embodiment in which the float 10 is not symmetric about the central shaft 20. The float is tapered having a greater width at one end and then decreasing to a point at its other end. This embodiment is intended to provide the benefits of having a longer and shorter axis and the benefit of passive orientation but with an improvement over the shape indicated in FIG. 7B. The embodiment shown in 7B may have relatively large bearing loads on the central shaft 20 in operational conditions. These large bearing loads come about because the waterplane area (and hence buoyant force) on one side of the central shaft is so much greater than on the other. The embodiment shown in FIG. 7C is intended to address this bearing issue.

Figure 8A:
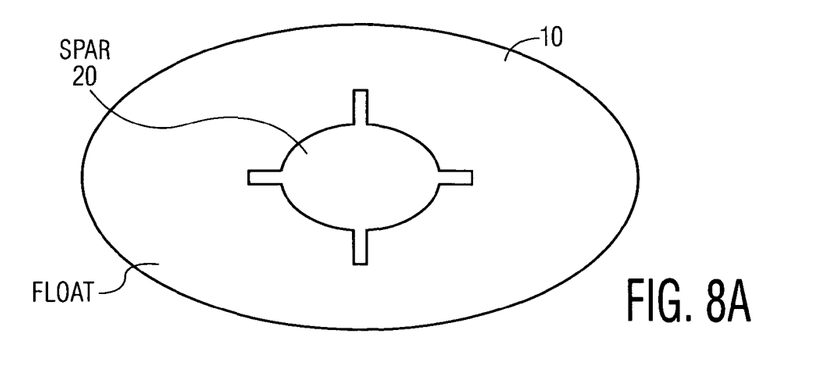
FIG. 8A is a top view of a float interleaved with a spar.
Figure 8B:
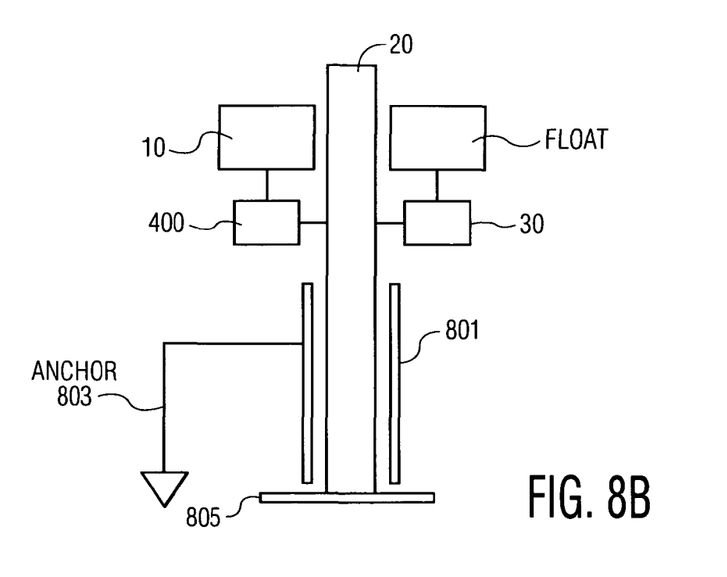
FIG. 8B is a highly simplified cross-sectional diagram of a mooring and anchoring mechanism for enabling a float and spar of the type shown in FIG. 8A to rotate together.
Figure 8C:
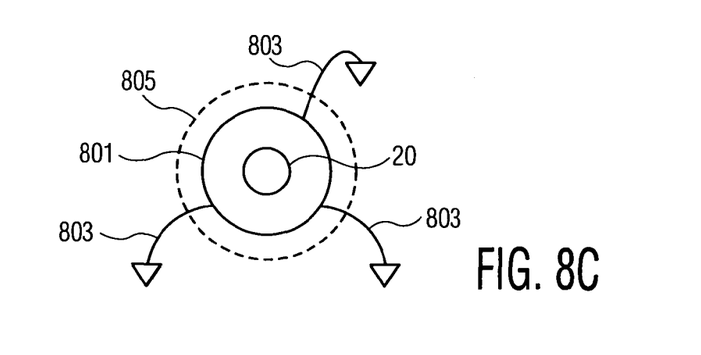
FIG. 8C is a top view of the submerged portion of the spar of FIG. 8B below the float further illustrating the mooring and anchoring arrangement for the WEC shown in FIGS. 8A and 8B.

FIGS. 8A and 8B illustrate a WEC having a spar 20 interleaved with a float 10 such that they can move up and down (in heave) relative to each other while preventing any significant rotational motion of the spar relative to the float. For this configuration, it is impractical if not impossible to decouple the float and spar. Therefore, when the float is rotated for optimizing the power conversion efficiency, it is necessary that the spar also rotate together with the float. FIGS. 8B and 8C illustrate a mooring and anchoring mechanism which allow the spar to rotate together with the float while preventing the WEC from drifting. As shown in FIG. 8B, a PTO 30 connected between the float and spar can, at all times, convert their relative up/down motion into electrical energy. The rotation control 400 is coupled to the float and/or spar to cause them to rotate in unison. The spar is allowed to rotate but held in place in a vertical direction by means of a sleeve 801 shown extending below the float and along a submerged portion of the spar. FIGS. 8B and 8C show 3 anchors 803 attached to the sleeve 801 to keep it in place. The lower portion of the spar is shown to be terminated in a plate 805 which can function as a heave plate and to hold the sleeve above a certain part of the spar. The particular mooring and anchoring mechanism shown in the figures is for purpose of illustration and any other suitable arrangement may be used which allows the spar to rotate together with the float.

What is claimed is:

1. A wave energy converter (WEC) comprising:
   an asymmetrically shaped float having a length (L) and a width (W), wherein the length, L, is greater than the width, W, and a spar, the spar and float moving relative to each other as a function of the waves;
   a power take off device (PTO) coupled between the asymmetric float and the spar for converting their relative motion into useful power; and
   apparatus coupled to the float for controlling and changing the orientation of the float as a function of at least one of the direction and amplitude of the waves.

2. A wave energy converter (WEC) as claimed in claim 1, wherein said float has top and bottom surfaces extending along a plane generally parallel to the surface of a body of water and said float moving up and down generally in phase with the waves present in the body of water;
   wherein said spar extends in a direction generally perpendicular to the surface of the body of water and said spar being either stationary or moving differentially relative to the float; and
   wherein the apparatus includes means for orienting the longer side of the float to face oncoming waves for one condition of the waves and for changing the orientation of the longer side of the float for another condition of the waves.

3. A wave energy converter (WEC) as claimed in claim 2, wherein the apparatus orients the longer side of the asymmetrical float to face incoming waves when the amplitude of the waves is below a predetermined amplitude and reorients the float so its narrower side faces the incoming waves when the amplitude of the waves is above a predetermined level.

4. A wave energy converter (WEC) as claimed in claim 2, wherein said apparatus includes means for sensing the amplitude of the waves; and wherein, for the amplitude of the waves being less than a predetermined value, the long side of the float is oriented to face the incoming waves; and wherein, for the amplitude of the waves being greater than a predetermined value, the narrower side of the float is oriented to face the incoming waves and the longer side is oriented in a generally parallel position to the oncoming waves.

5. A wave energy converter (WEC) as claimed in claim 1, wherein said apparatus includes means for sensing the direction of the waves.

6. A wave energy converter (WEC) as claimed in claim 3, wherein said apparatus for orienting the float includes one of active means and passive means for rotating the float.

7. A wave energy converter (WEC) as claimed in claim 4, wherein said apparatus for orienting the float includes active means for rotating the spar and the float.

8. A wave energy converter (WEC) as claimed in claim 4, wherein said apparatus for orienting the float includes passive means for rotating the float and also the spar.

9. A wave energy converter (WEC) as claimed in claim 1, wherein said asymmetrically shaped float has one of a generally elliptical and rectangular shape.

10. A wave energy converter (WEC) as claimed in claim 1, wherein the value of L is equal to kW, where k is any number greater than one (1) and wherein the length L of the float is selected to be a fraction of the typical wavelengths of the waves where the WEC is located.

11. A wave energy converter (WEC) as claimed in claim 4, wherein said apparatus for orienting the float including said active means for rotating the float includes a wave amplitude sensing mechanism for supplying corresponding signals to a signal processor and controller for operating an electromechanical system coupled to the float to control its orientation.

12. A wave energy converter (WEC) as claimed in claim 3, wherein said apparatus for orienting the float includes a fin attached to the long side of the float for effectively extending the length of the float.

13. A wave energy converter (WEC) as claimed in claim 1, wherein said apparatus for orienting the float includes mounting the float relative to the spar so the center of the float is located off-center relative to the spar.

14. A wave energy converter (WEC) as claimed in claim 1, wherein the asymmetrical float is formed such that the width of the float is tapered to vary along its length, being wider at one end and narrower at its other end.

15. A wave energy converter (WEC) as claimed in claim 1, wherein said spar and float are interleaved whereby the spar and float rotate in unison.

16. A wave energy converter (WEC) as claimed in claim 15, wherein an anchoring and mooring system is coupled to the spar to allow it to rotate and move up and down while preventing excessive lateral displacement.

17. A wave energy converter (WEC) as claimed in claim 15, wherein the anchoring and mooring system includes a sleeve mounted around a submerged portion of the spar and means attached to the sleeve for anchoring it to the sea floor.

18. A wave energy converter (WEC) comprising:
   an asymmetrically shaped float having a length (L) and a width (W), wherein the length, L, is greater than the width, W; said float intended to be deployed to lie parallel to the surface of a body of water and to move generally in phase with the waves present in the body of water;
   a spar extending in a direction generally perpendicular to the surface of the body of water and said spar being either stationary or moving differentially relative to the float; and
   control means for controlling the orientation and rotation of the float; said control means responsive to one of the amplitude and direction of surface waves impinging on the float for orienting the longer side of the float to receive oncoming waves when the amplitude of the waves is below a predetermined level and for changing the orientation of the float so the narrower side of the float receives the oncoming waves when the amplitude of the waves is greater than said predetermined level.

19. A method for operating a wave energy converter (WEC), having a float and a spar which move relative to each other and a power take off device (PTO) connected between the float and the spar to convert their relative motion into useful power, so as to increase its power generating capability and its survivability comprising the steps of:
- selecting the float to be an asymmetrical float wherein one side is longer than the other;
- orienting the float so its longer side faces the incoming waves when the amplitudes of the waves are below a predetermined value in order to increase its power producing capability; and
- orienting the float so its longer side is generally parallel to the incoming waves and its shorter side faces the incoming waves when the amplitudes of the waves are above a predetermined value to reduce the forces to which the float is subjected.

20. A method for operating a WEC as claimed in claim 19, wherein the WEC includes signal processing means for including wherein the sensing the amplitude of the waves and wherein the step of orienting the float includes the step of processing signals corresponding to the sensed amplitude for determining the orientation of the float.

21. A method for operating a wave energy converter (WEC), having a float and a spar which move relative to each other and a power take off device (PTO) connected between the float and the spar to convert their relative motion into useful power, so as to increase its power generating capability and its survivability comprising the steps of:
- selecting the float to be an asymmetrical float wherein one side is longer than the other;
- sensing the direction of the incoming waves and producing signals corresponding thereto;
- orienting the float in response to the sensed signals so its longer side faces the incoming waves as their direction changes.

22. A wave energy converter (WEC) comprising:
- an asymmetrically shaped floating body having a length (L) and a width (W), wherein the length, L, is greater than the width, W, and wherein the float moves as a function of the waves;
- a power take off device (PTO) coupled to the float and responsive to its movement for converting its movement into useful power; and
- apparatus coupled to the floating body for controlling and changing the orientation of the floating body as a function of at least one of the direction and amplitude of the waves.

* * * * *